(12) United States Patent
Hogstad et al.

(10) Patent No.: US 9,030,909 B2
(45) Date of Patent: May 12, 2015

(54) METHOD OF CONDUCTING A SEISMIC SURVEY

(75) Inventors: Kai Hogstad, Harstad (NO); Bente Fotland, Harstad (NO); Constantin Gerea, Heimdal (NO)

(73) Assignee: Statoil Petroleum AS, Stavanger (NO)

( * ) Notice: Subject to any disclaimer, the term of this patent is extended or adjusted under 35 U.S.C. 154(b) by 1451 days.

(21) Appl. No.: 12/278,446

(22) PCT Filed: Feb. 6, 2007

(86) PCT No.: PCT/GB2007/000399
§ 371 (c)(1),
(2), (4) Date: Jan. 20, 2009

(87) PCT Pub. No.: WO2007/091041
PCT Pub. Date: Aug. 16, 2007

(65) Prior Publication Data
US 2009/0219783 A1    Sep. 3, 2009

(30) Foreign Application Priority Data

Feb. 6, 2006    (GB) .................................... 0602337.8

(51) Int. Cl.
*G01V 1/02* (2006.01)
(52) U.S. Cl.
CPC ........................................ *G01V 1/02* (2013.01)
(58) Field of Classification Search
CPC ...... G01V 1/02; G01V 1/3808; G01V 1/3861
USPC ............. 102/23, 301; 114/244, 253; 181/104, 181/106, 111, 112; 340/7 R, 25.5 R; 367/20, 367/53, 57, 154; 702/6, 14
See application file for complete search history.

(56) References Cited

U.S. PATENT DOCUMENTS

| | | | |
|---|---|---|---|
| 2,077,707 | A | 4/1937 | Melton |
| 2,531,088 | A | 11/1950 | Thompson |
| 2,907,389 | A | 10/1959 | Hitzman |
| 3,052,836 | A | 9/1962 | Postma |
| 3,288,242 | A | 11/1966 | Loeb |
| 3,332,487 | A | 7/1967 | Jones |

(Continued)

FOREIGN PATENT DOCUMENTS

| | | |
|---|---|---|
| EP | 1 385 971 | 4/1972 |
| EP | 0087271 | 8/1983 |

(Continued)

OTHER PUBLICATIONS

Written Opinion and International Search Report for International Application No. PCT/GB2007/000399 dated May 2, 2007.

(Continued)

*Primary Examiner* — Daniel L Murphy
(74) *Attorney, Agent, or Firm* — Patterson Thuente Pedersen, P.A.

(57) ABSTRACT

A method of conducting a seismic survey of an area including a region of high seismic velocity regimes in a shallow overburden. According to the method, a zone is identified in which the boundary of the high seismic velocity region has a substantially constant critical angle and a course is plotted through the identified zone. A zone based directional seismic source is applied sequentially, with a directivity angle equal to or close to the measured critical angle. The response is detected using receivers.

16 Claims, 1 Drawing Sheet

(56) References Cited

U.S. PATENT DOCUMENTS

| | | | |
|---|---|---|---|
| 3,349,866 A | 10/1967 | Mifsud | |
| 3,398,356 A | 8/1968 | Still | |
| 3,548,299 A | 12/1970 | Duroux et al. | |
| 3,548,631 A | 12/1970 | Farmer et al. | |
| 3,806,795 A | 4/1974 | Morey | |
| 3,836,960 A | 9/1974 | Gehman et al. | |
| 3,959,721 A | 5/1976 | Roschuk et al. | |
| 3,975,674 A | 8/1976 | McEuen | |
| 4,010,413 A | 3/1977 | Daniel | |
| 4,047,098 A | 9/1977 | Duroux | |
| 4,079,309 A | 3/1978 | Seeley | |
| 4,136,754 A | 1/1979 | Manin | |
| 4,168,484 A | 9/1979 | Wright, Jr. | |
| 4,242,740 A | 12/1980 | Ruehle | |
| 4,258,321 A | 3/1981 | Neale, Jr. | |
| 4,258,322 A | 3/1981 | Rocroi et al. | |
| 4,296,379 A | 10/1981 | Yoshizumi | |
| 4,308,499 A | 12/1981 | Thierbach et al. | |
| 4,417,210 A | 11/1983 | Rocroi et al. | |
| 4,446,434 A | 5/1984 | Sternberg et al. | |
| 4,451,789 A | 5/1984 | Meador | |
| 4,456,067 A | 6/1984 | Pinner | |
| 4,489,276 A | 12/1984 | Yu | |
| 4,506,225 A | 3/1985 | Loveless et al. | |
| 4,547,733 A | 10/1985 | Thoraval | |
| 4,562,557 A | 12/1985 | Parks et al. | |
| 4,575,830 A | 3/1986 | Ingram et al. | |
| 4,583,095 A | 4/1986 | Peterson | |
| 4,594,551 A | 6/1986 | Cox et al. | |
| 4,616,184 A | 10/1986 | Lee et al. | |
| 4,617,518 A | 10/1986 | Srnka | |
| 4,633,182 A | 12/1986 | Dzwinel | |
| 4,633,449 A | 12/1986 | Ingram et al. | |
| 4,652,829 A | 3/1987 | Safinya | |
| 4,660,645 A | 4/1987 | Newlove | |
| 4,670,166 A | 6/1987 | McDougall | |
| 4,672,588 A | 6/1987 | Willen | |
| 4,677,438 A | 6/1987 | Michiguchi et al. | |
| 4,760,340 A | 7/1988 | Denzau et al. | |
| 4,791,998 A | 12/1988 | Hempkins et al. | |
| 4,835,474 A | 5/1989 | Parra et al. | |
| 4,872,144 A | 10/1989 | Young et al. | |
| 4,906,575 A | 3/1990 | Silver | |
| 4,957,172 A | 9/1990 | Patton et al. | |
| 4,986,354 A | 1/1991 | Cantu | |
| 4,992,995 A | 2/1991 | Favret | |
| 5,025,218 A | 6/1991 | Ramstedt | |
| 5,043,667 A | 8/1991 | Schofield | |
| 5,044,435 A | 9/1991 | Sperl | |
| 5,066,916 A | 11/1991 | Rau | |
| 5,083,611 A | 1/1992 | Clark | |
| 5,103,920 A | 4/1992 | Patton | |
| 5,111,437 A | 5/1992 | Rice | |
| 5,177,445 A | 1/1993 | Cross | |
| 5,185,578 A | 2/1993 | Stolarczykz | |
| 5,192,952 A | 3/1993 | Johler | |
| 5,280,284 A | 1/1994 | Johler | |
| 5,373,443 A | 12/1994 | Lee et al. | |
| 5,400,030 A | 3/1995 | Duren et al. | |
| H1490 H | 9/1995 | Thompson et al. | |
| 5,486,764 A | 1/1996 | Thompson et al. | |
| H1524 H | 4/1996 | Thompson et al. | |
| H1561 H | 7/1996 | Thompson et al. | |
| 5,563,513 A | 10/1996 | Tasei et al. | |
| 5,581,024 A | 12/1996 | Meyer, Jr. et al. | |
| 5,689,068 A | 11/1997 | Locatelli et al. | |
| 5,704,142 A | 1/1998 | Stump | |
| 5,767,679 A | 6/1998 | Schroder | |
| 5,777,478 A | 7/1998 | Jackson | |
| 5,811,973 A | 9/1998 | Meyer, Jr. | |
| 5,825,188 A | 10/1998 | Montgomery et al. | |
| 5,841,280 A | 11/1998 | Yu et al. | |
| 5,877,995 A | 3/1999 | Thompson et al. | |
| 5,886,526 A | 3/1999 | Wu | |
| 5,892,361 A | 4/1999 | Meyer, Jr. et al. | |
| 5,901,795 A | 5/1999 | Tsao et al. | |
| 5,940,777 A | 8/1999 | Keskes | |
| 5,955,884 A | 9/1999 | Payton et al. | |
| 5,987,388 A | 11/1999 | Crawford et al. | |
| 6,002,357 A | 12/1999 | Redfern et al. | |
| 6,011,557 A | 1/2000 | Keskes et al. | |
| 6,023,168 A | 2/2000 | Minerbo | |
| 6,026,913 A | 2/2000 | Mandal et al. | |
| 6,041,018 A | 3/2000 | Roche | |
| 6,049,760 A | 4/2000 | Scott | |
| 6,060,884 A | 5/2000 | Meyer, Jr. et al. | |
| 6,060,885 A | 5/2000 | Tabarovsky et al. | |
| 6,087,833 A | 7/2000 | Jackson | |
| 6,101,448 A | 8/2000 | Ikelle et al. | |
| 6,114,972 A | 9/2000 | Smith | |
| 6,157,195 A | 12/2000 | Vail, III | |
| 6,163,155 A | 12/2000 | Bittar | |
| 6,181,138 B1 | 1/2001 | Hagiwara et al. | |
| 6,184,685 B1 | 2/2001 | Paulk et al. | |
| 6,188,221 B1 | 2/2001 | Van de Kop et al. | |
| 6,188,222 B1 | 2/2001 | Seydoux et al. | |
| 6,225,806 B1 | 5/2001 | Millar et al. | |
| 6,236,212 B1 | 5/2001 | Wynn | |
| 6,246,240 B1 | 6/2001 | Vail, III | |
| 6,294,917 B1 | 9/2001 | Nichols | |
| 6,339,333 B1 | 1/2002 | Kuo | |
| 6,389,360 B1 | 5/2002 | Alft et al. | |
| 6,480,000 B1 | 11/2002 | Kong | |
| 6,628,119 B1 | 9/2003 | Eidesmo et al. | |
| 6,678,616 B1 * | 1/2004 | Winkler et al. | 702/6 |
| 6,696,839 B2 | 2/2004 | Ellingsrud et al. | |
| 6,717,411 B2 | 4/2004 | Ellingsrud et al. | |
| 6,842,006 B2 | 1/2005 | Conti et al. | |
| 6,859,038 B2 | 2/2005 | Ellingsrud et al. | |
| 6,864,684 B2 | 3/2005 | Ellingsrud et al. | |
| 6,900,639 B2 | 5/2005 | Ellingsrud et al. | |
| 6,932,017 B1 * | 8/2005 | Hillesund et al. | 114/244 |
| 7,126,338 B2 | 10/2006 | MacGregor et al. | |
| 7,567,084 B2 | 7/2009 | Eidesmo et al. | |
| 2003/0038634 A1 | 2/2003 | Strack | |
| 2003/0043692 A1 | 3/2003 | Ellingsrud et al. | |
| 2003/0048105 A1 | 3/2003 | Ellingsrud et al. | |
| 2003/0052685 A1 | 3/2003 | Ellingsrud et al. | |
| 2003/0067842 A1 * | 4/2003 | Sukup et al. | 367/20 |
| 2004/0001389 A1 | 1/2004 | Tang | |
| 2004/0027130 A1 | 2/2004 | Ellingsrud et al. | |
| 2010/0045295 A1 | 2/2010 | Mittet et al. | |

FOREIGN PATENT DOCUMENTS

| | | |
|---|---|---|
| EP | 0512756 | 11/1991 |
| EP | 0814349 | 12/1997 |
| FR | 2479992 | 10/1981 |
| GB | 2 087 556 | 5/1982 |
| GB | 2087556 | 5/1982 |
| GB | 2129939 | 5/1984 |
| GB | 2155182 | 9/1985 |
| GB | 2 231 602 | 11/1990 |
| GB | 2 256 715 | 12/1992 |
| GB | 2 296 567 | 7/1996 |
| GB | 2 301 902 | 12/1996 |
| GB | 2 355 538 | 4/2001 |
| GB | 2399640 | 9/2004 |
| GB | 2421800 | 7/2006 |
| WO | WO 81/01617 | 6/1981 |
| WO | WO 89/10463 | 2/1989 |
| WO | WO 90/00749 | 1/1990 |
| WO | WO 92/13172 | 6/1992 |
| WO | WO 92/15771 | 9/1992 |
| WO | WO 92/15900 | 9/1992 |
| WO | WO 94/20864 | 9/1994 |
| WO | WO 96/06367 | 2/1996 |
| WO | WO 96/33426 | 10/1996 |
| WO | WO 97/33184 | 9/1997 |
| WO | WO98/28638 | 7/1998 |
| WO | WO 99/13966 | 3/1999 |
| WO | WO 00/00850 | 1/2000 |
| WO | WO 00/13037 | 3/2000 |
| WO | WO 00/13046 | 3/2000 |

(56) References Cited

FOREIGN PATENT DOCUMENTS

| | | |
|---|---|---|
| WO | WO 00/54075 | 9/2000 |
| WO | WO 00/63718 | 10/2000 |
| WO | WO01/35124 | 5/2001 |
| WO | WO 01/35124 | 5/2001 |
| WO | WO01/55749 | 8/2001 |
| WO | WO 01/57555 | 8/2001 |
| WO | WO 02/14906 | 2/2002 |
| WO | WO 03/034096 | 4/2003 |
| WO | WO 03/048812 | 6/2003 |
| WO | WO 2004/083898 | 9/2004 |

OTHER PUBLICATIONS

Ellingsrud et al., "How Electromagnetic Sounding Technique Could be Coming to Hydrocarbon E & P", 20 First Break (Mar. 2002).
Eidesmo et al., "Sea Bed Logging (SBL), a new method for remote and direct identification of hydrocarbon filled layers in deepwater areas", 20 First Break (Mar. 2002).
Kaufman et al., "EM Field of an Electric Dipole on the Surface of a Medium Containing a Thin Resistant Layer", Frequency and Transient Soundings, publ. Elsevier, (1983).
Kaufman et al., 1981 Annual Meeting Abstracts: Marine EM Prospecting System, 47 Geophysics 431 (1982).
Garg et al., "Synthetic Electric Sounding Surveys Over Known Oil Fields", 49 Geophysics 1959-67 (Nov. 1984).
Yuan et al., "The Assessment of Marine Gas Hydrates Through Electrical Remote Sounding: Hydrate Without a BSR?"; 27 Geophys. Res. Letts. 204-217 (Aug. 15, 2000).
Edwards, "On the Resource evaluation of Marine Gas Hydrate Deposits Using Sea-Floor Transient Electric Dipole-Dipole Methods", 62 Geophysics 63-74 (Jan. 1997).
Chave et al., "Some Comments on Seabed Propagation of ULF/ELF Electromagnetic Fields", 25 Radio Science 825-36 (Sep. 1990).
MacGregor et al., "Use of Marine Controlled-Source Electromagnetic Sounding for Sub-Basalt Exploration", 48 Geophys. Prosp. 1091-1106 (Apr. 2000).
MacGregor et al., "Marine Controlled Source Electromagnetic Sounding: Development of a Regularized Inversion for 2-Dimensional Resistivity Structures", 1 Lithos Science Report 103-109 (Apr. 1999).
MacGregor et al., "The RAMESSES Experiment—III. Controlled-Source Electromagnetic Sounding of the Reykjanes Ridge", 135 Geophys. J. Int. 776-89 (Jul. 1998).
Sinha et al., "Magmatic Processes at Slow Spreading Ridges: Implications of the Ramesses Experiment at 57 deg. 45'N on the Mid-Atlantic Ridge," 135 Geophys. J. Int. 731-45 (Jul. 1998).
Sinha et al., "Evidence for Accumulated Melt Beneath the Slow-Spreading Mid-Atlantic Ridge," 355 Phil. Trans. R. Soc. Lond. A 233-53 (Jan. 1997).
Search Report—PCT/GB99/02823 dated Dec. 8, 1999.
Great Britain Search Report 0119245.9 dated May 28, 2002.
"Applications of 3-Dimensional Electromagnetic Induction by Sources in the Ocean", A proposal submitted to MAST III under Area C: Marine Technology, Part 1.
"Applications of 3-Dimensional Electromagnetic Induction by Sources in the Ocean", A proposal submitted to MAST III under Area C: Marine Technology, Part 2.
Barton et al., "LITHOS", Cambridge Advanced Lithological Imaging Project Phase 1: 1998-2001 Sub-basalt Imaging, Aug. 21, 1997.
Chave et al., "Controlled Electromagnetic Sources for Measuring Electrical Conductivity Beneath the Oceans 1", Forward Problem and Model Study, J. Geophysical Research, vol. 87, No. B7, pp. 5327-5338, Jul. 10, 1982.
Constable et al., "Marine Controlled-Source Electromagnetic Sounding 2, The PEGASUS Experiment", Journal of Geophysical Research. 101. B3 (1996): pp. 5519-5530.
Edwards et al., "The Assessment of Marine Gas Hydrates through Electrical Remote Sounding: Hydrate without a BSR", Geophysical Research Letters, vol. 27, No. 16, pp. 2397-2400, Aug. 15, 2000.

Evans, Constraints on the Large-Scale Porosity and Permeability Structure of Young Oceanic Crust from Velocity and Resistivity Data, Geophysical Journal International, vol. 119, pp. 869-879, 1994.
Evans et al., "On the Electrical Nature of the Axial Melt Zone at 13 degrees North on the East Pacific Rise", Journal of Geophysical Research, vol. 99, No. B1, pp. 577-588, Jan. 1994.
Evans et al, Upper Crustal Resistivity Structure of the East-Pacific Rise Near 13 degrees North, Geophysical Research Letters, vol. 18, No. 10, pp. 1917-1920, Oct. 1991.
Explorations, Scripps Institution of Oceanography, vol. 4, No. 2, 1997.
Flosadottir et al., "Marine Controlled-Source Electromagnetic Sounding 1. Modeling and Experimental Design", Journal of Geophysical Research, vol. 101, No. B3, pp. 5507-5517, Mar. 10, 1996.
Thirion et al., "Estimation of Formation Shear Velocity by Wavelet Transform in Acoustic Logging" Signal Processing VII: Theories and Applications, 1994, pp. 237-240.
GB Search Report for GB 0306059.7 dated Jun. 27, 2003.
MacGregor, "Electromagnetic Investigation of the Reykjanes Ridge Near 58° North", PhD Thesis, University of Cambridge.
MacGregor et al., "Electrical Resistivity Structure of the Valu Fa Ridge, Lau Basin, from Marine Controlled-Source Electromagnetic Sounding", Geophysical Journal International, 146.1, pp. 217-236, Jul. 2001.
MacGregor et al., "Electromagnetic Evidence for a Crustal Melt Accumulation Beneath the Slow Spreading Reykjanes Ridge", Abstract for 13.sup.th Workshop on EM Induction in the Earth.
MacGregor et al., "Marine Controlled Source Electromagnetism: Effect of Source-Receiver Geometry on the Response of 1-D models", 1996.
Sinha, "Controlled Source EM Sounding: Survey Design Considerations for Hydrocarbon Applications", LITHOS Science Report, vol. 1, pp. 95-101, Apr. 1999.
Sinha et al., "An Active Source Electromagnetic Sounding System for Marine Use", Marine Geophysical Researches, 12:59-68, 1990.
GB Search Report for GB Application No. 0400242.8 dated May 26, 2004.
Unsworth, "Electromagnetic Exploration of the Oceanic Crust with Controlled-Sources", Chptr 5, Insight into Induction, PhD Thesis, University of Cambridge, 1991.
Unsworth et al., "Electromagnetic Induction by a Finite Electric Dipole Source Over a 2-D Earth", Geophysics, vol. 58, pp. 198-214, 1993.
Yuan et al., "Electromagnetic Assessment of Offshore Methane Hydrate Deposits on the Cascadia Margin, GP22A-08", American Geophysical Union Fall Meeting, San Francisco, 1998.
Young et al., "Electromagnetic Active Source Near the East-Pacific Rise", Geophysical Research Letters, vol. 8, No. 10, pp. 1043-1046, Oct. 1981.
Ursin, "Review of elastic and electromagnetic wave propagation in horizontally layered media," Geophysics, vol. 48, No. 8, pp. 1063-1081, Aug. 1983.
Osen et al., "Removal of water-layer multiples from multi-component sea-bottom data," Geophysics, vol. 64, No. 3, pp. 838-851, May-Jun. 1999.
Kritski et al., "Properties of near surface marine sediments from wavelet correlation analysis" Geophysical Research Letters. 2002.
Kritski et al.,"Mutliscale reconstruction of shallow marine sediments using wavelet correlation" Eos. Trans. AGU Fall Meeting. 2002.
Kaufman et al., "Electromagnetic Field of an Electric Dipole on the Surface of a Medium Containing a Thin Resistant Layer," pp. 285-313.
Greeg et al., "Remote mapping of hydrocarbon extent using marine Active Source EM Sounding," EAGE 65$^{th}$ Conference & Exhibition—Stavanger, Norway, 4 pages, Jun. 2-5, 2003.
Written Opinion—PCT/GB2004/001144 dated Mar. 17, 2004.
White et al., Mineral exploration in the Thompson nickel belt, Manitoba, Canada, using seismic and controlled-source EM methods, Geophysics. vol. 65, No. 6. Nov-Dec. 2000. pp. 1871-1881.
International Search Report for PCT/GB2004/00114 dated Mar. 17, 2004.

(56) References Cited

OTHER PUBLICATIONS

Application and File History for U.S. Appl. No. 11/030,264, filed Jan. 6, 2005. Inventor Kritski.
Application and File History of U.S. Patent No. 7,567,084 issued Jul. 28, 2009. Inventor Eidesmo.
Application and File History for U.S. Publication No. 2010/0045295, published Feb. 25, 2010, Inventor Mittet.
International Search Report for PCT/GB2007/003484 and Search reports for GB 0618238.0.
Cheesman et al. "On the Theory of Sea-Floor Conductivity Mapping using Transient Electromagnetic Systems": vol. 52, No. 2; Feb. 1987; pp. 204-217.
Greaves et al.; New Dimensions in Geophysics for Reservoir Monitoring: SPE Formation Evaluation:, Paper SPE 20170; pp. 141-150; 1991.
Nekut et al., "Petroleum Exploration Using Controlled Source Electromagnetic, Methods", Proceedings of the IEEE, vol. 77(2), pp. 338-362, 1989.
Spies, "Recent Developments in the use of Surface Electrical Methods for Oil and Gas Exploration in the Soviet Union", Geophysics, vol. 48(8), pp. 1102-1112, 1983. Abstract only.
Strack et al., "Integrating Long-Offset Transient Electromagnetics (LOTEM) with Seismics in an Exploration Environment", Geophysical Prospecting, vol. 44, pp. 997-1017, 1996.

* cited by examiner

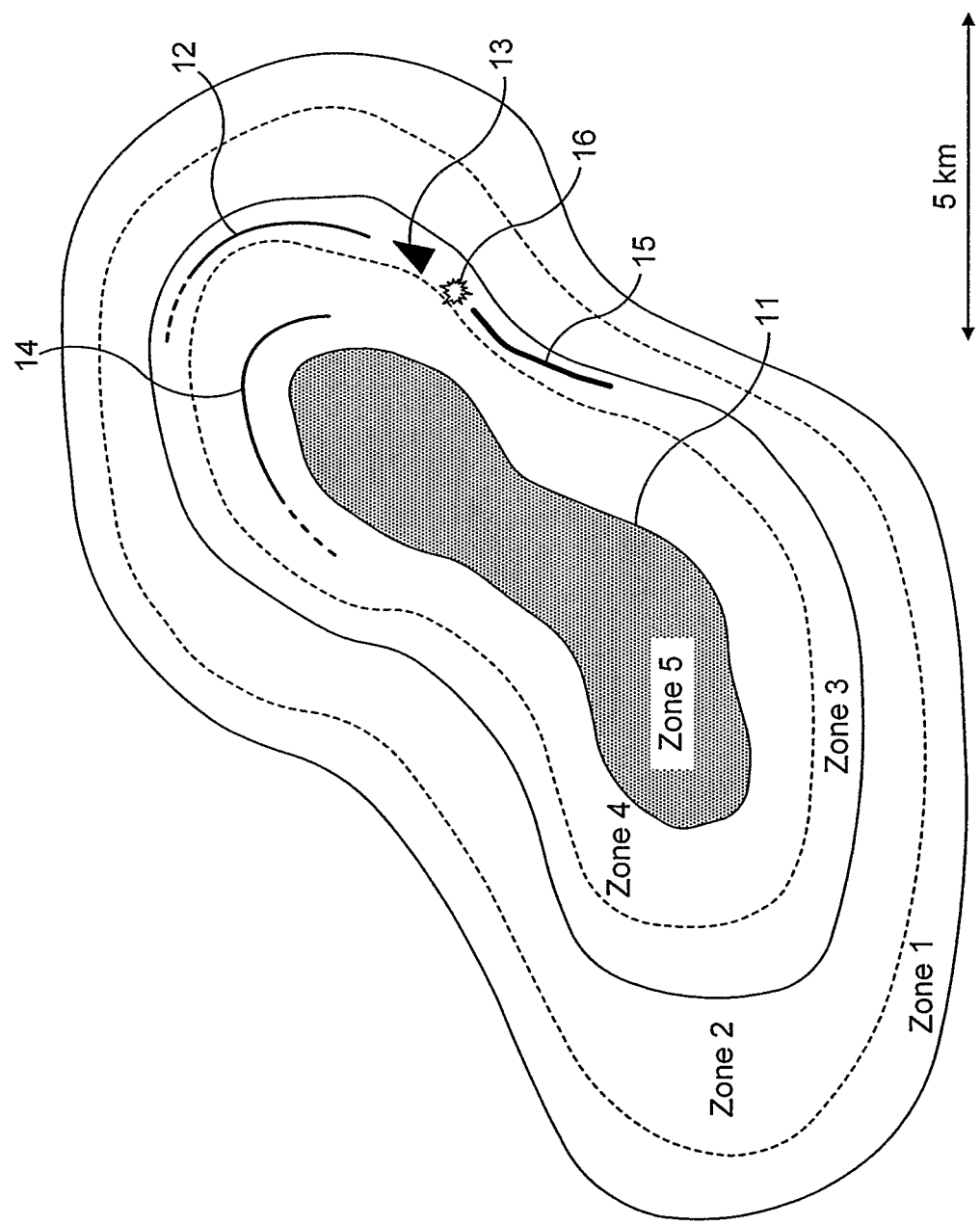

METHOD OF CONDUCTING A SEISMIC SURVEY

RELATED APPLICATIONS

This application claims priority to PCT Application No. PCT/GB2007/000399, filed Feb. 6, 2007, and Great Britain Application No. 0602337.8, filed Feb. 6, 2006, the disclosures of which are hereby incorporated herein by reference in their entirety.

TECHNICAL FIELD

The present invention is concerned with seismic acquisition methods and is particularly concerned with areas where the target is below high seismic velocity deposits or intrusions, such as evaporites, basalt and carbonates. An example of such an area is the Nordkapp Basin in the Barents Sea. High seismic velocity materials have low critical angles, where the critical angle is defined as the arcsine of the velocity ratio between two layers with different physical properties (Snell's law).

BACKGROUND ART

Currently, in a marine application, a seismic source with a constant predefined directivity, is applied for shooting direction following a regular pattern at the sea surface, such as dip and strike straight line, straight line star and multi azimuth, circular and elliptical surveys. A source directivity angle greater than the critical angle will generate overcritical secondary energy and reduced primary energy, whereas a source directivity angle lower than the critical angle will generate a reduced illumination sector for the highest angles. Ideally, the source directivity is designed to be close to the critical angles for the boundaries located at and close to the seafloor, to avoid overcritical energy and reduced illumination. Normally, the source directivity is adjusted for younger and relatively low velocity, high critical angle strata in the overburden. The corresponding source directivity optimal for the relatively high critical angle boundaries in this overburden is therefore relatively open. During acquisition of a conventional survey, the source directivity is kept constant and often the same source directivity is applied for surveys in different geological provinces.

Due to the uplift and erosion history in the Barents Sea, older and relatively high velocity, low critical angle boundaries are located close to the seafloor. This situation is extreme in the Nordkapp Basin characterised by the presence of several high velocity salt diapirs located close to the seafloor. The older sediments surrounding the salt diapirs here tend to dip steeply, creating a high velocity gradient towards the salt and along the unconformity boundary situated close to the seafloor. In this area, the near seafloor boundaries will generally have very variable critical angles, between a normal critical angle in the younger strata away from the salt to very low values for the top salt boundary.

Application of a normal and constant directivity source, for instance over basalts or salt, will therefore generate overcritical energy of a varying degree and with maxima above the top high velocity layer.

The effects of overcritical generated noise are assumed to be the origin of the noisy regions with lack of primary events, defined as the shadow zone, beneath and surrounding the high velocity layer.

Many attempts have been made to remove the source-generated noise by processing, but these have so far been unsuccessful. When the target is within a shadow zone, it is of great interest to improve the data quality for further successful exploration of this basin.

SUMMARY OF THE INVENTION

It is therefore a specific object of the invention to provide a method of seismic acquisition which would provide new and more reliable information on the subsurface beneath high seismic velocity regimes.

According to the invention there is provided a method of conducting a seismic survey of an area including a region of high seismic velocity regimes in a shallow overburden which comprises: identifying a zone in which the boundary of the high seismic velocity region has a substantially constant measured critical angle, plotting a course through the identified zone, and sequentially applying a zone-based directional seismic source with a directivity angle equal to or close to the measured critical angle. The response is detected using one or more receivers.

The seismic acquisition methods of the invention are thus particularly concerned with introducing a new concept of adapting the source directivity angles according to the changes in the critical angles at and close to the seafloor. This new acquisition method is believed to be more appropriate in areas characterised by high-velocity deposits and intrusions, such as evaporites, basalt and carbonates.

It is a more general object of the invention to provide reliable seismic information from existing geological features.

More generally, therefore, the invention contemplates a method of conducting a seismic survey of a geological feature which comprises applying a directional seismic source, which is preferably zone-based, to the feature with a directivity angle equal to or close to the measured critical angle of the feature.

This can be achieved as described above in accordance with the specific application of the invention defined or in other ways. Thus, the general aspect of the invention extends to the use of a seismic source including a series of seismic guns or sub-arrays of guns, with different directivities tuned to different critical angles, fired selectively along a course, so that the directivity of the guns/sub-array fired is always optimised to the geological feature under consideration. The course followed by a vessel towing the source may be regular, preferably straight.

This concept can be applied to the specific object of the invention. Thus the invention can be considered to extend to a method in which the vessel is sailed along a regular course, such as a straight line, which traverses the different critical angle zones. The source has a number of guns or sub-arrays and each gun or sub-array has a common directivity which is tuned to a particular critical angle. Then, as the source passes through a zone, the guns/sub-arrays with the directivity corresponding to the zone's critical angle is fired. This is repeated through the various zones, firing different guns/sub-arrays, as appropriate.

Preferably, in addressing the specific object of the invention, a plurality of zones are identified, in each of which the boundary of the high seismic region has a substantially constant measured critical angle range and the procedure is repeated in each zone.

The high seismic velocity deposits overlaying the target may include salt and salt associated rocks, basalts, carbonates and old sedimentary rocks. The directivity angle may be +/−20° of the critical angle, more preferably +/−5°, most preferably +/−3°. The directivity angle would be changed for a survey in a different geological province, to a value more tuned to the critical angle in that province. The seismic source and the streamer(s) consisting of several receivers are towed behind the vessel.

The seismic data collected can be processed in the conventional way. This will provide enhanced information on those areas previously characterised as shadow zones.

In the present invention, the source directivity may be tuned to the varying critical angles in the overburden above the target and in this way, may eliminate overcritical generated noise and may optimise full illumination of the main target reflectors in the subsurface. In a salt related province such as the Nordkapp Basin, the critical angle may vary gradually from about 20° above the salt to 50° above the youngest strata.

To obtain the optimal tuning between source directivity and critical angle, both the vessel source and the streamers carrying the receivers should follow predefined constant critical angle zones (+/– a few degrees). A map of critical angles may be generated from refraction velocity analyses of seismic data already belonging to an existing data base, and this may be input to a control system determining the shooting direction.

Preferably, the streamers are steerable such that they remain within the zones defined by the same observed critical angle.

In an area with considerable change of critical angle in the overburden, the main objective is to reduce the generated overcritical energy to a minimum. The optimal solution is to tune the source directivity and the directivity of the streamers to the spatial variation of the actual critical angle in the overburden.

Preferably, therefore the invention extends to apparatus for carrying out a method according to the invention, the apparatus including a source with flexibility in directivity. The apparatus preferably comprises a 3D acquisition system utilizing a source with a variable directivity, tuned to the varying critical angle relations in the overburden. This acquisition system may use streamers with steering and navigation positioning equipment in order to maintain their presence within the predefined zones.

The characteristic shadow zones with a lack of primary events beneath and surrounding any high velocity layer most likely appear as a result of the application of conventional acquisition techniques, operating with constant source directivity and generating overcritical energy and noise. The many attempts to remove the overcritical energy generated noise by processing have so far been unsuccessful and are believed to be impossible. The present invention may provide optional imaging of the target reflectors beneath the salt, thus improving the data quality for a further successful exploration.

In many areas, targets are below regional high velocity layers, such as basalts or carbonates, and a constant source directivity adapted to this regional layer may be applied. The other situation will be where the high velocity area above a target has a limited horizontal extension, as a single object or several objects. In a conventional straight line 3D acquisition survey, a great deal of non-productive time is wasted in turning the vessel around for every line shift. This is complicated by the presence of the streamers which are towed behind the vessel.

However, in areas where the high velocity layer is of limited horizontal extent, with the method according to the invention, the seismic data is acquired continuously around the high seismic velocity region, with no line shifts. Preferably there are a plurality sequential of sail lines (or plotted courses) around the region optionally at varying distances from the region. Each sail line may have a slightly different critical angle. An example of such an area is the Nordkapp Basin.

Generally, the contour of a constant critical angle will approximately follow a common strata truncation line. For the Nordkapp Basin the following applies: the optimal shooting direction is defined by common source directivity and critical angle will then be close to the strike direction all around the salt related structures. To ensure dense sampling in the dip direction, the streamer separation is preferably small. As the total truncated zone will vary around the salt, the number of sail lines will be defined from where the truncation zone is broadest. This means that in narrowest truncation zone, the reflection points will overlap and automatically introduce extra-dense sampling in the dip direction. This relation is advantageous as these areas generally also have the greatest dip and need a denser sampling. These three positive effects (no line shift, optimal coverage and variable spatial sampling) are enjoyed by the present invention compared to conventional acquisition techniques.

By reducing the overcritical energy to a minimum, the secondary energy and noise giving rise to the shadow zone beneath and around the salt diapirs will also be reduced to a minimum. This in turn will result in an improvement in seismic imaging in areas where currently there is little hope of interpretable seismic data from standard acquisition techniques, hence improved exploration and well planning can be achieved.

In a case of a new discovery, a 3D data set acquired in this way may be regarded as a base survey for a future 4D data acquisition. For the salt related structures in the Nordkapp Basin, the seismic data quality is currently too poor to plan for production. Improved seismic data expected as result of the present invention may open the way for the optimal positioning of future production wells.

The invention may be carried into practice in various ways and an embodiment is illustrated in the accompanying drawing, which shows a salt formation schematically in plan view.

BRIEF DESCRIPTION OF THE DRAWINGS

FIG. 1 is a schematic representation of a salt formation beneath a sea floor.

DETAILED DESCRIPTION OF THE DRAWINGS

FIG. 1 shows a salt formation 11 beneath the sea floor. The salt formation 11, which is indicated as zone 5, is surrounded by four further zones, namely, zones 4, 3, 2 and 1 respectively, moving generally radially outwards from zone 5. Each zone is defined by a measured constant critical angle +/–3° C. The further a zone is away from the salt formation, the greater will be its constant critical angle.

When a survey is to be conducted, a course is plotted within a zone for a seismic survey vessel 13. Part of such a course is shown as line 12 in zone 3 in FIG. 1. A second similar route is indicated (in part) by the line 14, which is closer to the salt formation 11 and which therefore passes through points with a smaller critical angle than for the line 12. Further similar routes are plotted in the other zones. For each zone, the source directivity will be constant and tuned to the critical angle and will decrease stepwise from zone to zone towards the salt formation 11. Each of the zones is defined using a critical angle map, generated from refraction velocity analysis of existing 2D seismic data and the routes thus produced can be programmed into the vessel navigation system.

In practice, the vessel 13 tows a seismic source 16 and several receiver streamers 15. At given positions along the route, the seismic source will be fired, and the seismic response will be monitored by the receivers. This is repeated continuously along the route around the salt and then again with a minor lateral shift along a new route. For all the routes inside a given zone a given and constant source directivity is applied.

The invention claimed is:

1. A method of conducting a seismic survey of a geological feature comprising a plurality of zones, the method comprising applying a directional seismic source to each zone of the feature with a directivity angle equal to or close to a measured critical angle of the respective zone of the feature, wherein for each zone, the source directivity angle is constant and tuned to the critical angle of the respective zone, whereby the seismic source is a zone-based directional source, and wherein the seismic source comprises a series of seismic guns with different directivities tuned to different critical angles.

2. A method according to claim 1, for conducting a seismic survey of an area including a region of high seismic velocity regimes in a shallow overburden, comprising the steps of:
   i.) identifying a zone in which a boundary of the high seismic velocity region has a substantially constant measured critical angle;
   ii.) plotting a course through the identified zone, and;
   iii.) sequentially applying the zone-based directional seismic source with a directivity angle equal to or close to the measured critical angle of the identified zone.

3. A method according to claim 2, including the further step of identifying a plurality of zones, in each of which the boundary of the high seismic velocity region has a substantially constant measured critical angle range and performing steps ii. and iii. in each identified zone.

4. A method according to claim 1, wherein the seismic guns are fired selectively along a course, so that the directivity of the guns is optimized to the geological feature under consideration.

5. A method according to claim 4, wherein the course followed by a vessel towing the source is substantially straight, for at least a portion of its extent.

6. A method according to claim 1, wherein the directivity angle is +/−20° of the critical angle of the respective zone.

7. A method according to claim 6, wherein the directivity angle is +/−5% of the critical angle of the respective zone.

8. A method according to claim 1, wherein a response to the applied seismic source is detected by means of a plurality of receivers.

9. A method according to claim 8, wherein the receivers are towed behind the same vessel that tows the source.

10. A method according to claim 9, wherein the vessel towing the source and the receivers is arranged to follow a course which corresponds to a predefined constant critical angle zone.

11. A method according to claim 8, wherein the receivers are mounted on streamers extending behind a vessel.

12. A method according to claim 11, wherein the streamers are steerable.

13. A method according to claim 8, wherein the source directivity and a directivity of any streamers carrying receivers, are respectively tuned to the spatial variation of the actual critical angle in the overburden.

14. An apparatus for carrying out a method as claimed in claim 1, the apparatus comprising a seismic source with flexibility in directivity and a seismic receiver.

15. An apparatus according to claim 14, comprising a 3D acquisition system, utilizing a source with a variable directivity, tuned to varying critical angles in the overburden.

16. Apparatus according to claim 14, comprising a plurality of receivers operated on streamers, the streamers having steering and navigational positioning equipment.

\* \* \* \* \*